US012610442B2

(12) United States Patent
Peine et al.

(10) Patent No.: US 12,610,442 B2
(45) Date of Patent: Apr. 21, 2026

(54) METHOD FOR PRESENCE MONITORING AND ENVIRONMENT MONITORING IN A HOSPITAL ROOM

(71) Applicant: Clinomic Medical GmbH, Aachen (DE)

(72) Inventors: Arne Peine, Aachen (DE); Lukas Martin, Aachen (DE)

(73) Assignee: Clinomic Medical GmbH, Aachen (DE)

( * ) Notice: Subject to any disclaimer, the term of this patent is extended or adjusted under 35 U.S.C. 154(b) by 31 days.

(21) Appl. No.: 18/294,704

(22) PCT Filed: Aug. 4, 2022

(86) PCT No.: PCT/EP2022/000069
§ 371 (c)(1),
(2) Date: Feb. 2, 2024

(87) PCT Pub. No.: WO2023/011747
PCT Pub. Date: Feb. 9, 2023

(65) Prior Publication Data

US 2025/0063644 A1 Feb. 20, 2025

(30) Foreign Application Priority Data

Aug. 5, 2021 (DE) ..................... 10 2021 120 437.2

(51) Int. Cl.
*H05B 47/115* (2020.01)

(52) U.S. Cl.
CPC .................................. *H05B 47/115* (2020.01)

(58) Field of Classification Search
CPC ....... H05B 47/115; G16H 40/67; G16H 40/00
See application file for complete search history.

(56) References Cited

U.S. PATENT DOCUMENTS 9,820,365 B2 11/2017 Schlangen et al.
10,064,255 B2 8/2018 Barroso et al.
(Continued)

FOREIGN PATENT DOCUMENTS

CN 105612816 A 5/2016
CN 106354172 A 1/2017
(Continued)

OTHER PUBLICATIONS

International Search Report, with English translation, issued in corresponding International Application No. PCT/EP2022/000069, date of mailing Dec. 7, 2022 (7 pages).
(Continued)

*Primary Examiner* — Renan Luque
(74) *Attorney, Agent, or Firm* — FLYNN THIEL, P.C.

(57) ABSTRACT

A method for presence monitoring and environmental monitoring in a hospital room is provided. The method comprises conducting a detection of a person and/or a device in the hospital room to provide presence monitoring by detecting a marker of the person and/or the device;

Figure 1:
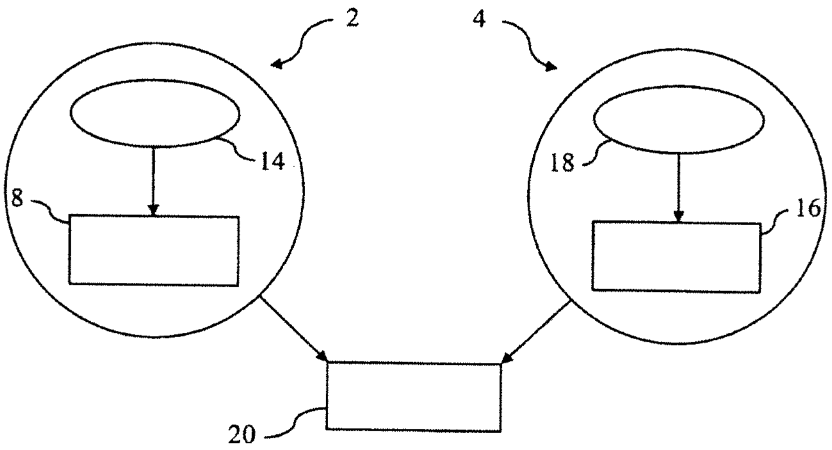

conducting a measurement of at least one parameter in the hospital room, in order to enable environmental monitoring; and conducting a control of a device provided inside and/or outside the hospital room, which is a lighting array, whereby the control is conducted depending on the performed detection of the person and/or the device and/or depending on the performed measurement of the parameter.

14 Claims, 3 Drawing Sheets

(56) References Cited

U.S. PATENT DOCUMENTS

| | | | | |
|---|---|---|---|---|
| 2015/0126806 | A1 | 5/2015 | Barroso et al. | |
| 2015/0256355 | A1 | 9/2015 | Pera et al. | |
| 2016/0148489 | A1 * | 5/2016 | Reeder | A61B 5/1113<br>340/501 |
| 2017/0221344 | A1 * | 8/2017 | Cox | G08B 25/10 |
| 2022/0296332 | A1 * | 9/2022 | Satish | G06V 20/20 |

FOREIGN PATENT DOCUMENTS

| | | | |
|---|---|---|---|
| CN | 108427460 | A | 8/2018 |
| CN | 209475343 | U | 10/2019 |
| EP | 3335632 | A1 | 6/2018 |
| TW | 201011943 | | 3/2010 |

OTHER PUBLICATIONS

Written Opinion of the International Searching Authority issued in corresponding International Application No. PCT/EP2022/000069, date of mailing Dec. 7, 2022 (6 pages).

* cited by examiner

METHOD FOR PRESENCE MONITORING AND ENVIRONMENT MONITORING IN A HOSPITAL ROOM

The present invention relates to a method for presence monitoring and environmental monitoring in a hospital room. The invention further relates to a system for presence monitoring and environmental monitoring in a hospital room as well as a computer programme.

It is known from the prior art, for example from publication U.S. Pat. No. 10,064,255 B2, that sensors can be used to detect the presence of an object or a person and, based on this, to control the lighting conditions in a room. Such detection can be used, for example, to recognise the presence of medical staff in a hospital room, indicating specifically a situation in which an increased lighting level is required.

Publication TW 2010 11943 A discloses in particular a lighting system to display the colour spectrum of the course of the day. The same, in other words, is disclosed in publication CN 105 612 816 A.

In particular, publication CN 209 475 343 U discloses a wake-up system for patients coming out of a coma.

Publication CN 108 427 460 A discloses a system for monitoring environmental quality in hospitals. The system comprises in particular an air monitoring module with a temperature sensor, a humidity sensor, a sensor for the concentration of volatile organic substances, a sensor for the $CO_2$ concentration and a sensor for the concentration of suspended particles in the air.

Publication CN 106 354 172 A discloses temperature control in hospitals.

Publication EP 3 335 632 A1 discloses a device for the combined detection of several signs of life such as respiratory activity, heartbeat activity and monitoring of the patient's movement. The publication further reveals that movement monitoring is of interest, for example, for patients in the recovery room from anaesthesia or for patients in a coma.

The disadvantage of the known solutions is that presence monitoring or environment monitoring is only possible to a limited extent. The indication of presence and environment monitoring is often cumbersome or, in many situations, not recognisable at all. Moreover, presence monitoring is too unreliable in many cases, i.e. frequently false detections occur, for example. The indication of the ambient quality in publication CN 108 427 460 A is displayed in particular via a monitoring terminal, which can be more error-prone or involve greater technical effort, and also requires a longer read-off time. Another problem is that it is no longer possible to read it from a long distance away. In publication EP 3 335 632 A1, no actual action takes place based on the detection of a movement, meaning that presence detection can only be used to a limited extent.

It is therefore an object of the present invention to at least partially eliminate the disadvantages described above. In particular, it is the object of the present invention to provide improved presence monitoring and/or environmental monitoring in which an output can be recognised more easily and/or more reliably. Moreover, it is particularly a function to provide a technical aid for improving the treatment of a patient in a hospital.

The above mentioned function is solved by a method with the features of the claims, a system, and by a computer programme. Further features and details of the invention can be seen from the claims, the description and the drawings. Features and details described in connection with the method according to the invention naturally also apply in connection with the system used in accordance with the invention and the computer programme used in accordance with the invention, and vice versa in each case, so that reference is or can always be made to the individual aspects of the invention with respect to the disclosure.

The function is solved in particular by a method for presence monitoring and environmental monitoring in a hospital room, comprising:

- conducting a detection of a person and/or a device in the hospital room to provide presence monitoring, in particular by detecting a marker of the person and/or the device, preferably via a Bluetooth connection,
- conducting a measurement of at least one parameter in the hospital room, in particular a carbon dioxide concentration and/or a temperature and/or a sound level, in order to enable environmental monitoring,
- conducting a control of a device provided inside and/or outside the hospital room, which is a lighting array, whereby the control is conducted depending on the performed detection of the person and/or the device and/or depending on the performed measurement of the parameter.

The preceding steps can be conducted one after the other or in any order, whereby individual steps can also be conducted repeatedly.

The following terminology should also be explained here:

In the context of the invention, indefinite and definite articles or numerals, e.g. "one", "two", "etc.", are always to be understood as "at least" indications, unless expressly stated otherwise. Moreover, numerical data and data on process parameters and/or device parameters are to be understood in the technical sense, i.e. as being provided with the usual tolerances. Even from the explicit specification of "leastwise" or "at least" or similar, it should not be concluded that the simple use of the article or the number, i.e. without specifying "at least" or similar, a restriction, e.g. in the sense of "precisely", should be implied. In concrete terms, the person can also be several people, the device can also be several devices, the parameter can also be several parameters, the lighting device can also be several lighting devices, and the lighting segment can also be several lighting segments.

A hospital room refers here in particular to a room in which patients are accommodated during their inpatient medical treatment in a hospital. A person is understood in particular to be a person related to the treatment of a patient, for example medical personnel, and a device is understood in particular to be a device related to the treatment of the patient, for example a defibrillator, and/or also a device that the person carries with them (e.g. a mobile device such as a smartphone, an ID card or similar).

In simple terms, presence monitoring means in particular that the hospital room is monitored to determine whether a relevant person and/or a relevant device is present in the hospital room at a given time. This relevance may exist, for example, if the person is a medical staff or the device is a medical device. For monitoring, for example, detection can be carried out with a specific frequency in order to be able to detect a radio transmitter with this frequency. In particular, a marker is understood to be such a radio transmitter. For example, a Bluetooth beacon or a ZigBee terminal device is conceivable as the marker. Furthermore, the marking can be detected via a Bluetooth or NFC reading device, where NFC stands for Near Field Communication. It may be conceivable that an NFC or Bluetooth reading device is located at a hospital bedside or in close proximity to a patient's bedside or near the entrance to the hospital room. The reading device can preferably be part of a system according to the invention, in particular a detection device.

Environmental monitoring is understood in particular to mean that the hospital room is monitored with respect to at least one defined parameter, whereby at least the one parameter can represent a physically measurable quantity, such as a carbon dioxide concentration, a temperature or a sound level. For this, a measurement of these parameters is conducted, whereby at least one sensor can be used for the measurement. It is particularly conceivable that several sensors are combined to form a sensor system. In particular, the environmental monitoring can conduct the monitoring of the parameter in the room air of the hospital room.

In particular, a control system is understood to mean that incoming information, which is provided for example by the recording monitoring system and/or the environmental monitoring system, is first forwarded to a control unit. The incoming information can be generated in dependence on the conducted detection and/or measurement and, in particular, can be information about a result of the detection and/or measurement. Optionally, the control can also be executed in dependence on an evaluation of patient data, in particular medical data. For example, it is conceivable that an evaluation of a patient's heartbeat or oxygen saturation leads to a triggering of a control of the lighting array, especially if such patient data reaches a critical area. The incoming information is then processed in the control unit using a stored calculation algorithm and output as instruction. The instructions here correspond in particular to the manipulation of the lighting array provided inside and/or outside the hospital room. The term lighting array refers in particular to at least one lighting device, for example a lamp, whereby, in accordance with the term "array", several lighting devices can also be arranged in a functionally and/or spatially coherent manner.

The lighting array can fulfil various functions. Hospital room lighting could conceivably be provided depending on the detection of the person and/or device, but possibly also depending on the identity of the detected person and/or device. The hospital room lighting can be designed to provide a day or night simulation and/or to support the patient's wake-up phase, for example after an anaesthetic. Furthermore, it is specifically foreseen that at least one lighting device of the lighting array corresponds to a signalling device, which can be designed for lighting with at least two or three different colours, in order to provide the lighting in these colours, in particular to identify the presence and environment monitoring. It can be foreseen that the signalling device is arranged outside the hospital room, for example in order to be able to assess the quality of the environment in the hospital room and/or any presence in a hospital corridor, whereby the quality of the environment corresponds to an evaluation of the environmental monitoring. Alternatively, it can be foreseen that the signaling device is only designed for lighting with one colour in order to indicate the quality of the environment in the hospital room or a possible presence when the lamp is active.

In addition, within the scope of the invention it is conceivable that the method further comprises:

conducting a determination of the presence of the person and/or the device based on the detection carried out, and in particular also the determination of an identity or classification of the person and/or the device (e.g. based on an identifier of the marking or the device), conducting an evaluation of the measurement of the at least one parameter, issuing a presence notification depending on the conducted determination, issuing an environmental message depending on the conducted evaluation, wherein the control is conducted in dependence on the presence notification issued and/or the environmental notification issued.

The presence is determined in particular by detecting a marking, for example a radio transmitter. If the presence of the person and/or the device is detected, preferably with a predetermined identity, the presence notification is performed. The presence notification corresponds in particular to the incoming information described above, which is transmitted to a control unit, for example, in order to control the lighting array provided on the basis of this information.

An evaluation of the measurement can, in simple terms, be understood as checking whether at least one parameter is within a defined range. This defined range may, for example, correspond to an acceptable range for a patient. The range can be specified by patient data, for example, which can be read out automatically for this purpose. If at least one parameter is outside this range, an ambient message is output, whereby the ambient message corresponds to the incoming information, analogous to the presence message, in order to perform a control of the intended lighting arrangement corresponding to the information based on this information.

The performance and evaluation can be carried out automatically. Furthermore, it can be foreseen that an operator can trigger a presence and/or environment message to initiate the execution of the control. A data interface to a database system can be provided for reading out the patient data. Furthermore, a configuration can be provided as to which areas and/or patient data are used.

Furthermore, it can be foreseen that the performance of the control also includes:

Adjusting an illumination colour of the illumination array based on the issued presence notification and/or the issued environment notification to visually signal the presence notification and/or environment notification to a hospital staff.

This can have the advantage that the hospital staff is informed at an early stage and in particular outside the hospital room, for example by a lighting device set up outside the hospital room, as to whether a specific person and/or a specific device is present in the hospital room and whether at least a parameter of the environmental monitoring requires an action by the hospital staff, although a corresponding arrangement within the hospital room may also be conceivable. It may be possible to assign different markings and therefore different lighting colours to personnel such as doctors, in particular depending on their function, and nurses.

Optionally, an emergency colour and/or lighting (possibly also lighting frequency such as flashing) can be set based on the presence message displayed and/or the environment message displayed, for example if an alarm is activated in the hospital room and/or a device for emergency treatment such as for resuscitation of a patient is located and/or used in the hospital room, so that the hospital room is already visible from the outside for other emergency personnel.

In the event that several parameters are measured as part of environmental monitoring, it may be possible that a specific colour is assigned to each of these parameters.

The lighting colours can, for example, be designed at least or exclusively according to a traffic light system, i.e. include "red", "yellow" and "green".

Pursuant to a further advantage, it may be provided that the lighting arrangement has at least two or at least three or exactly three lighting segments, in particular a segment display, in order to output the different lighting colours and/or to visually signal the presence message and/or environment message to hospital staff. This can have the advantage that a more differentiated information display of the presence and environment message is possible. The segments can be assigned different lighting colours. It may be conceivable that the segment display allows the display of numbers and/or letters in order to display different codes, whereby the codes may be specific to a particular presence or environmental notification.

It is also optionally conceivable that the lighting array comprises a room lighting device within the hospital room, whereby the method further comprises:

conducting a classification of the detected person and/or the detected device, increasing a brightness of the room lighting device to a predefined brightness level depending on the presence notification issued, the predefined brightness level and/or the increase in brightness depending on the classification.

Classification means, in particular, categorising the detected person and/or the detected device into an established class. The classification can also be carried out using the identification described above. For example, a class created can correspond to the class "function", for example "chief physician" or "nurse". This extension of the method can have the advantage that the brightness of a patient's room lighting device is automatically adjusted or deactivated, for the most part slightly, in order to create a more pleasant atmosphere for the patient and thus technically support the treatment.

An additional possibility may be that the lighting array comprises a lighting device outside the hospital room, in particular fixed to a wall, whereby the method further comprises:

conducting the evaluation of the measurement of at least one parameter in order to determine an ambient quality, whereby the ambient quality is preferably categorised into one of several levels for this purpose, conducting the control of the lighting device in order to visualise the environmental quality through the lighting device, in particular through a colour and/or brightness coding of the divided level.

This can have the advantage that a need for action is visualised in a more differentiated manner in order to enable hospital staff to prioritise. For example, it is possible to define time windows for the respective colour and/or brightness coding in which an action is required. The colour coding can also be implemented as a traffic light coding, i.e. the ambient quality is displayed for example in the colours "red", "yellow" and "green" depending on the deviation from a predefined range.

Furthermore, within the scope of the invention it is conceivable that the lighting array has at least one lighting device for presence monitoring and at least one further lighting device for environmental monitoring, the control for the lighting devices being carried out separately. A separate implementation can have the advantage that two messages, i.e. a presence message and an environmental message, can be displayed simultaneously and indicated by the lighting devices. The separate lighting devices can be of different designs so that, for example, the lighting device for presence monitoring corresponds to a single light and the lighting device for environmental monitoring corresponds to a segment display, whereby any number of other combinations are conceivable.

One further possibility is that the lighting array can also be controlled manually by an operator, in particular to deactivate visual signalling by the lighting array. This can have the advantage that, for example, visual signaling triggered by a system error can be deactivated. Furthermore, it is particularly conceivable that the visual signaling is deactivated by the hospital staff if an action corresponding to the visual signaling has been conducted, for example by opening a window in order to reduce the carbon dioxide concentration.

It is also conceivable that the lighting array could be controlled via an electrical connection. An electrical connection can be made via a USB, a USB-C, a Micro-USB, or a Lightning interface, whereby the list is not exhaustive. USB stands for Universal Serial Bus.

A further advantage within the scope of the invention can be achieved if the lighting array is controlled via a radio connection. A WLAN, a Bluetooth or an NFC connection are particularly conceivable for a radio connection, where WLAN stands for Wireless Area Network and NFC stands for Near Field Communication.

The invention also relates to a system for presence monitoring and environmental monitoring in a hospital room, comprising:

a detection device for implementing a detection of a person and/or a device in the hospital room to provide presence monitoring, whereby, preferably, detecting a marker of the person and/or the device, preferably via a Bluetooth connection, a measuring device for conducting a measurement of at least one parameter in the hospital room, in particular a carbon dioxide concentration and/or a temperature and/or a sound level, to enable environmental monitoring, a control device for conducting control of a lighting array provided inside and/or outside the hospital room, whereby the control is conducted depending on the performed detection of the person and/or the device and/or depending on the performed measurement of the parameter.

According to the invention, the system therefore brings with it the same advantages as have been described in detail with reference to the method pursuant to the invention. In addition, the system can be suitable to conduct the method pursuant to the invention.

A detection device is in particular understood to be an electronic device which is designed to detect a marking; for example, a sensor or a radio interface that can be provided in the detection device for this purpose.

A measuring device is in particular understood to be a device which is designed to measure at least one parameter, whereby the parameter can correspond to a physically measurable variable, so that the measuring device has in particular at least one sensor which is suitable for measuring the corresponding parameter. The measuring device preferably features electronics for measurement.

A control device is in particular understood to be a device which is designed to control the intended lighting array, for example to reduce or increase the brightness of a lighting device. The term control corresponds in particular to a directed influence on the performance of technical systems. A digital control system is provided in particular, whereby an analogue or binary control system may also be conceivable.

Another possibility is that the detection device and/or the measuring device is/are each designed as a sensor system in order to detect the person and/or the device and/or to measure at least one parameter.

A sensor system is understood to mean in particular that at least two sensors are read out via a common interface, whereby at least two sensors can preferably be arranged in a common housing or in close proximity to one another.

It is further conceivable within the scope of the invention that the detection device and/or the measuring device and/or the control device each have a fixing means for carrying out a fixation under a hospital bed of the hospital room, whereby the fixing means is preferably designed as an adhesive agent. It may also be envisaged that at least two of the devices have a common fastening means. It is also conceivable that the fastening means is designed for a screw, plug-in, latching or form-fitting connection to the hospital bed.

Another possibility is that the detection device and/or the measuring device and/or the control device are connected to each other and are designed as a stand-alone system and, in particular, have a common housing. Stand-alone means in particular that the system can fulfil its function without additional devices and is specifically designed as a modular construction. However, the system according to the invention can of course have interfaces for data exchange and/or for energy supply and/or for modular expansion.

A further advantage can be achieved within the scope of the invention if the marking is designed as a radio transmitter, in particular as a Bluetooth beacon. A Bluetooth beacon is defined in particular as a radio transmitter that emits Bluetooth signals. The Bluetooth Low Energy radio standard is the preferred choice, as it can have the advantage of being very energy-efficient.

A further advantage may be that the system has an interface to provide control of the lighting array, the interface being in the form of an electrical or radio interface. An electrical interface can be designed as a USB, a USB-C, a Micro-USB, or a Lightning interface, although the list is not exhaustive. USB stands for Universal Serial Bus. The radio interface can be designed as a Bluetooth, a WLAN or an NFC interface, although the list is not exhaustive, with WLAN standing for Wireless Area Network and NFC for Near Field Communication.

The invention also relates to a computer programme comprising commands which, when the computer program is executed by a computer, cause it to carry out the following steps and thus in particular to initiate the method according to the invention:

- initiating a detection of a person and/or a device in the hospital room to provide presence monitoring, in particular by detecting a marker of the person and/or device, preferably via a Bluetooth connection,
- initiating a measurement of at least one parameter in the hospital room, in particular a carbon dioxide concentration and/or a temperature and/or a sound level, to enable environmental monitoring,
- initiating control of a device provided inside and/or outside the hospital room, which is a lighting array, whereby the control is conducted depending on the performed detection of the person and/or the device and/or depending on the performed measurement of the parameter.

In this way, the computer programme according to the invention has the same advantages as those described in detail with reference to the method according to the invention. In addition, the computer programme can be suitable to be executed on the system according to the invention. The computer programme is executed, for example, by a processing device of the system according to the invention, which is electrically connected to the detection device and/or the measuring device and/or the control device.

Further advantages, features and details of the invention emerge from the following description, in which exemplary embodiments of the invention are described in detail with reference to the drawings. In this respect, the features mentioned in the claims and in the description can each be essential to the invention individually or in any combination. It shows:

FIG. 1 An exemplary embodiment for a schematic sequence of the method according to the invention.

FIG. 2A schematic arrangement of the system according to the invention in a hospital room.

FIG. 3A schematic representation of the structure of the system according to the invention and a lighting array.

FIG. 1 shows a schematic sequence of the method according to the invention. On the left side, the process of a presence monitoring 2 is visualised, with a detection 8 being carried out using a marking 14. On the right side, the process of environmental monitoring 4 is shown, with a measurement 16 of at least one parameter 18 being carried out. Thereby it can be envisaged that the detection 8 and/or the measurement 16 are carried out continuously with planned or triggered or accidental interruptions. Both processes can influence the control 20 arranged in the centre of the figure, for example when a marking 14 is detected or when a threshold value is exceeded for the at least one parameter 18, whereby the influence is shown in the figure by an arrow in each case.

Figure 2:
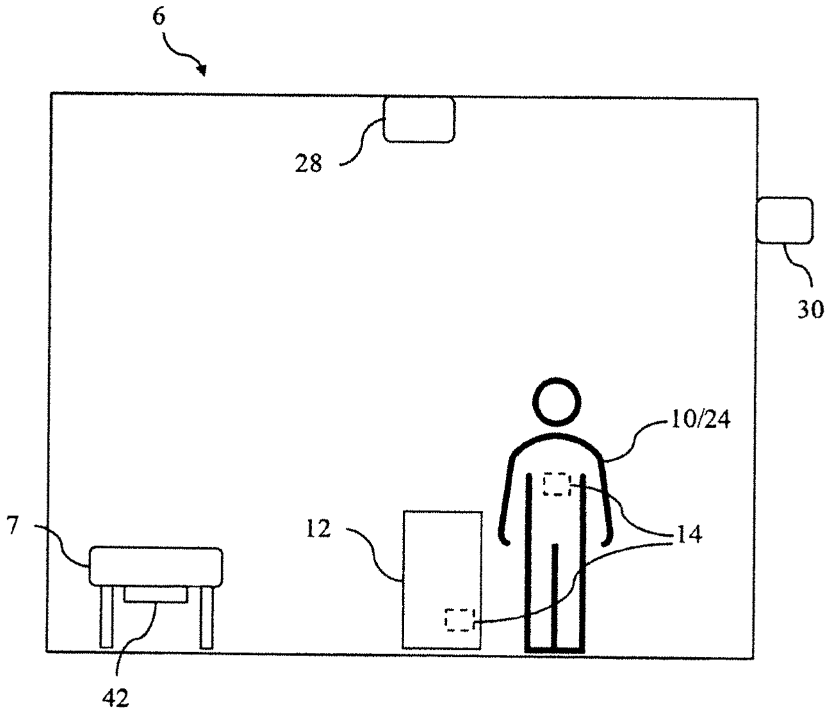

FIG. 2 shows schematically a hospital room 6 in which the system 42 according to the invention is arranged under a hospital bed 7. Two lighting devices 30 shown are also shown, with the room lighting device 28 inside the hospital room 6 and the second lighting device 30 outside the hospital room 6. Furthermore, a person 10 is shown, whereby the person 10 can be a hospital staff 24, whereby the person 10 carries a marker 14 with him. It may be conceivable that the marking 14 is present, for example, in a pocket of the person's clothing. Furthermore, a device 12 is shown, which also has a marking 14.

Figure 3:
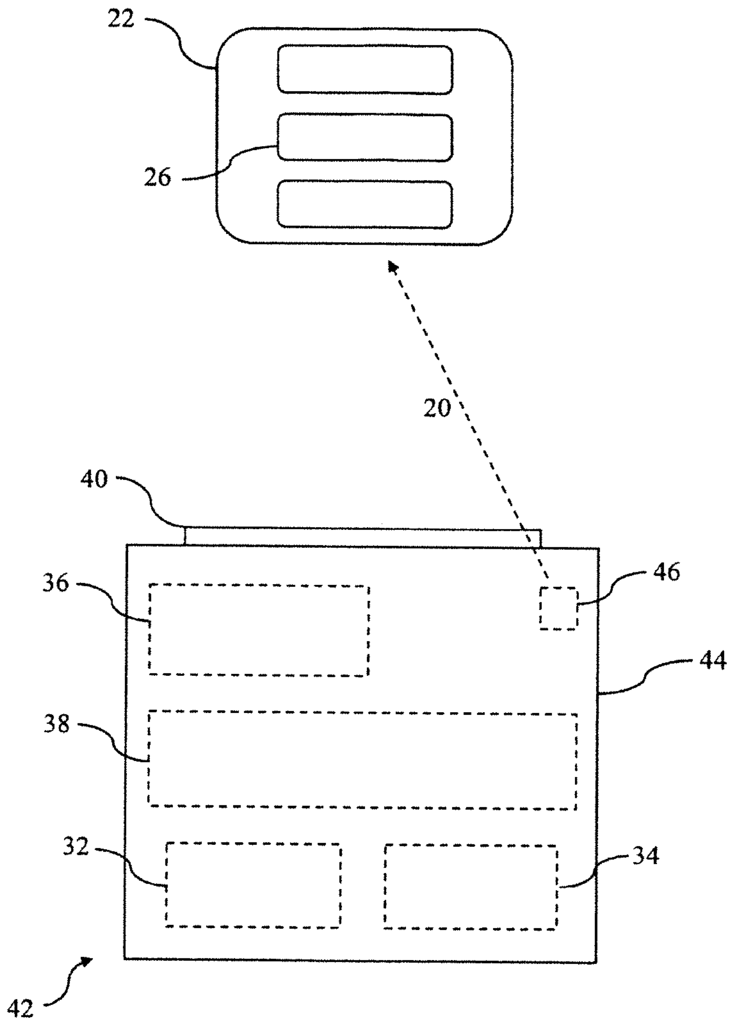

FIG. 3 schematically visualises a system 42 according to the invention, which has fastening elements 40 on the top. Furthermore, the system 42 has a housing 44. A control device 36, an interface 46, a sensor system 38, a detection device 32 and a measuring device 34 are present in the housing 44. Thereby it can be envisaged that the previously described elements present in the housing 44 are each connected to one another electrically or via a radio connection. Also shown is a lighting array 22, which has three lighting segments 26. The communication of the controller 20 of the lighting array 22 through the system 42 via the interface 46 is shown by a dashed arrow. The communication of the controller 20 can be carried out via an electrical or radio connection.

The above explanation of the embodiments describes the present invention solely in terms of examples. Of course, individual features of the embodiments can, if technically meaningful, be freely combined with one another without departing from the scope of the present invention.

LIST OF REFERENCE SYMBOLS USED

2 presence monitoring
4 environmental monitoring
6 hospital rooms 7 hospital bed
8 detection
10 person
12 device
14 marking
16 measurement
18 parameter
20 control
22 lighting array
24 hospital staff
26 lighting segment
28 room lighting device
30 lighting device
32 detection device
34 measuring device
36 control device
38 sensor system
40 fastening elements
42 system
44 Housing
46 interface

The invention claimed is:

1. A method for presence monitoring and environmental monitoring in a hospital room, comprising:

conducting of a detection of a person and/or a device in the hospital room to provide presence monitoring, whereby to this end by detecting a marker of the person and/or of the device, conducting of a measurement of at least one parameter in the hospital room, to enable environmental monitoring, conducting of a control system of a device provided inside and/or outside the hospital room which is a lighting array, whereby the control is conducted depending on the performed detection of the person and/or of the device and/or depending on the performed measurement of the parameter, conducting of a determination of the presence of the person and/or of the device based on the performed detection, conducting an evaluation of the measurement of at least one parameter, issuing a presence notification depending on the conducted determination, issuing an environmental message depending on the conducted evaluation, whereby the conducting of the control occurs in dependence on the issued presence notification and/or the issued environmental notification, wherein the lighting array features a room lighting array inside the hospital room, whereby the method further comprises:

conducting of a classification of the detected person and/or of the detected device, increasing a brightness of the room lighting device to a predefined brightness level depending on the presence notification issued, the predefined brightness level and/or the increase in brightness depending on the classification.

2. Method according to claim 1, wherein the conducting of the control further comprises:

adjusting of a lighting colour of the lighting array based on the issued presence notification and/or of the issued environment notification to visually issue a signal to one of the hospital staff.

3. Method according to claim 1, wherein the lighting array features at least two lighting segments to indicate the different lighting colours and/or to visually signal the presence notification and/or environmental notification to one of the hospital staff.

4. Method according to claim 1, wherein the lighting array features at least a lighting device for the presence monitoring and at least a further lighting device for the environmental monitoring, whereby the control for the lighting devices are conducted separately.

5. Method according to claim 1, wherein the control of the lighting array is additionally carried out manually by an operator.

6. Method according to claim 1, wherein the control of the lighting array is conducted via an electric connection.

7. Method according to claim 1, wherein the control of the lighting array is conducted via a radio connection.

8. A method for presence monitoring and environmental monitoring in a hospital room, comprising:

conducting of a detection of a person and/or a device in the hospital room to provide presence monitoring, whereby to this end by detecting a marker of the person and/or of the device, conducting of a measurement of at least one parameter in the hospital room, to enable environmental monitoring, conducting of a control system of a device provided inside and/or outside the hospital room which is a lighting array, whereby the control is conducted depending on the performed detection of the person and/or of the device and/or depending on the performed measurement of the parameter, conducting of a determination of the presence of the person and/or of the device based on the performed detection, conducting an evaluation of the measurement of at least one parameter, issuing a presence notification depending on the conducted determination, issuing an environmental message depending on the conducted evaluation, whereby the conducting of the control occurs in dependence on the issued presence notification and/or the issued environmental notification, wherein the lighting array features a lighting device outside the hospital room, whereby the method further comprises:

conducting the evaluation of the measurement of at least one parameter in order to determine an environmental quality, whereby the environmental quality is preferably classified into one of several levels for this purpose, conducting the control of the lighting device in order to visualise the environmental quality through the lighting device.

9. Method according to claim 8, wherein the conducting of the control further comprises:

adjusting of a lighting colour of the lighting array based on the issued presence notification and/or of the issued environment notification to visually issue a signal to one of the hospital staff.

10. Method according to claim 8, wherein the lighting array features at least two lighting segments to indicate the different lighting colours and/or to visually signal the presence notification and/or environmental notification to one of the hospital staff.

11. Method according to claim 8, wherein the lighting array features at least a lighting device for the presence monitoring and at least a further lighting device for the environmental monitoring, whereby the control for the lighting devices are conducted separately.

12. Method according to claim 8, wherein the control of the lighting array is additionally carried out manually by an operator.

13. Method according to claim 8, wherein the control of the lighting array is conducted via an electric connection.

14. Method according to claim 8, wherein the control of the lighting array is conducted via a radio connection.

* * * * *